Figure 3:
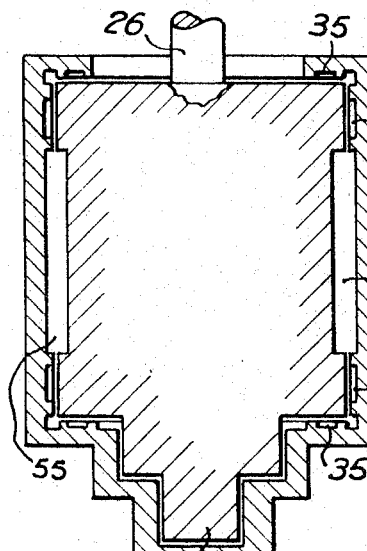

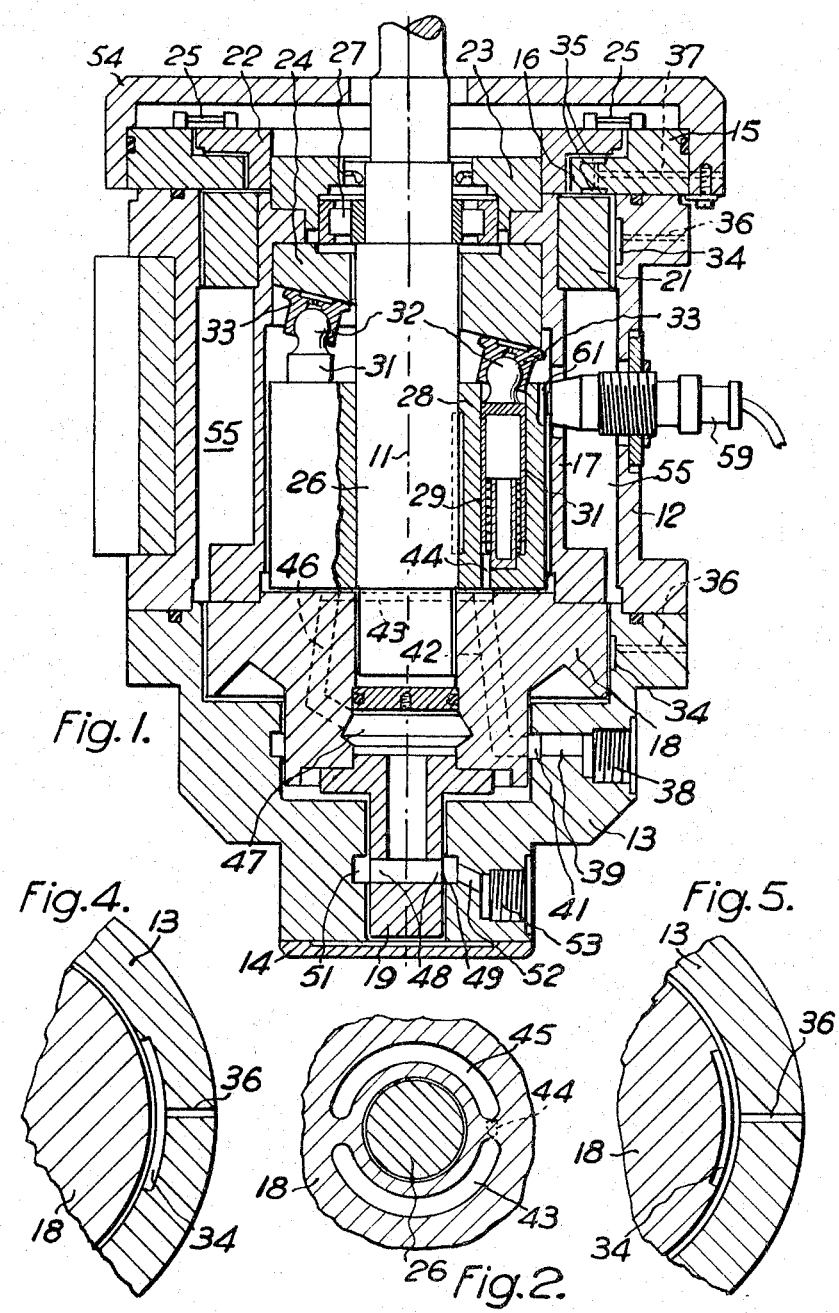

Inventors
Thomas M. Birchall
Roger St. J. Richards
By G. H. Imey
Atty.

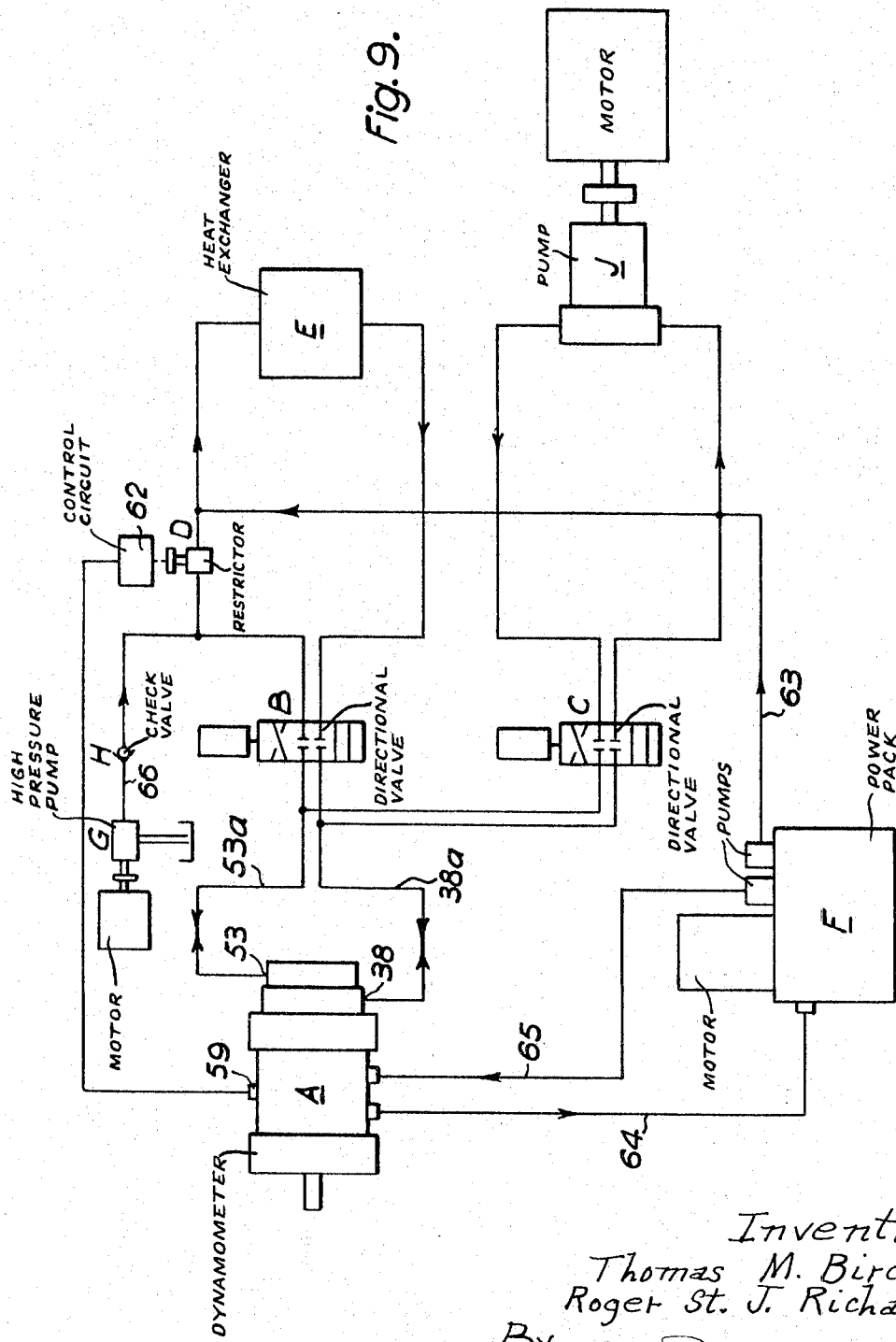

United States Patent Office 3,298,224
Patented Jan. 17, 1967

3,298,224
DYNAMOMETERS
Thomas Michael Birchall and Roger St. John Richards, both of Melton Mowbray, England, assignors to Production Engineering Research Association of Great Britain, Leicestershire, England, a British body corporate
Filed Apr. 27, 1964, Ser. No. 362,847
Claims priority, application Great Britain, Apr. 30, 1963, 17,022/63
13 Claims. (Cl. 73—134)

This invention relates to hydraulic dynamometers.

According to the invention the dynamometer incorporates a positive displacement hydraulic machine having its outer casing supported in anti-friction bearings so that the casing is free to rotate against the constraint of a torque-measuring linkage between the casing and a stationary part, and connection to external hydraulic inlet and outlet lines is made through communicating ports or passages formed in the machine casing and in the stationary part such that the machine casing is freed from any substantial static rotational constraint except that imposed by the torque measuring linkage.

This arrangement for transferring the hydraulic fluid into and out of the hydraulic machine enables high accuracy to be achieved and also a compact construction so that the dynamometer can be made small and light in relation to its power handling capacity.

The hydraulic machine may function as a pump in which case it discharges the fluid through a variable restrictor in the delivery line, the dynamometer then serving as an absorption dynamometer which absorbs power from the machine under test. The fluid passing the restrictor is desirably returned to the inlet line through a heat exchanger. Fluid lost by leakage from the machine is then also returned to the circuit at a point between the restrictor and the heat exchanger.

If the hydraulic machine is of suitable design so that it can act as a motor, the dynamometer may serve as a motoring dynamometer which supplies power to drive the machine under test.

The dynamometer may be provided with the necessary external equipment of restrictor and pressure supply to enable it to be used at choice as an absorption or motoring dynamometer and to be used effectively at low speeds as an absorption dynamometer. It can be used for the testing of machine tools, internal combustion engine, electric motors and other prime movers with or without their associated transmissions.

The positive displacement machine may be of any convenient type, such as piston, gear, vane or eccentric type. The torque measuring linkage may also be of any convenient type such as a spring balance, with or without deadweight loading, strain gauge link or links or other convenient load transducer.

The anti-friction bearings by which the machine casing is supported in the stationary part may be ball, roller or needle bearings, but are preferably hydrostatic bearings. The use of hydrostatic bearings ensures that the hydraulic machine casing and the stationary parts are always separated by a fluid film (gas or liquid), thus reducing static friction to zero.

Figure 6:
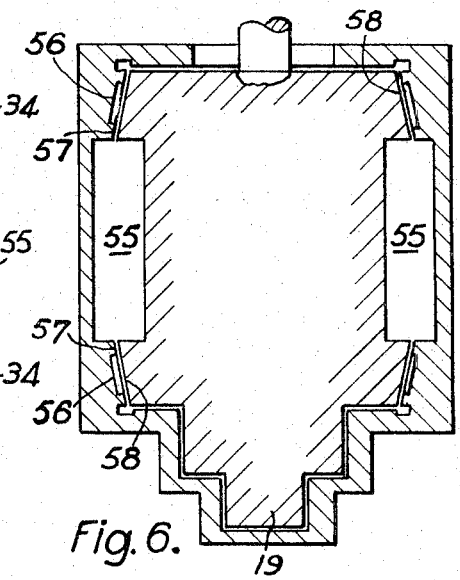
Figure 7:
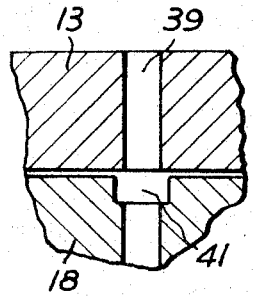
Figure 8:
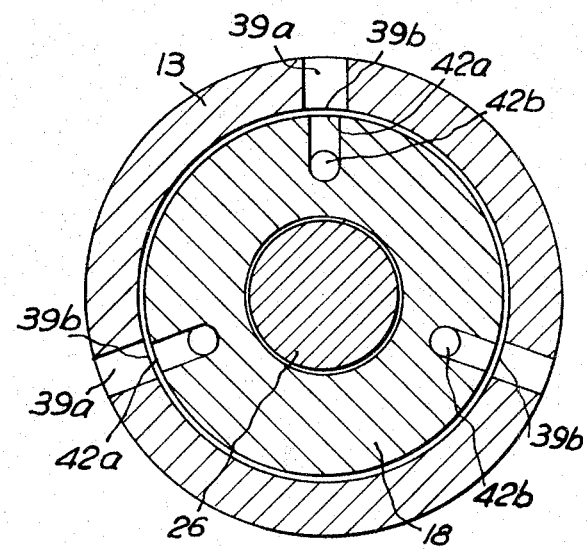

The invention will be further described with reference to the accompanying drawings illustrating an example of embodiment and some alternative details, and in which:

FIGURE 1 is an axial section of the dynamometer,
FIGURE 2 is a detail end view on the line II—II of FIGURE 1,
FIGURE 3 a diagrammatic axial section of a slight modification,
FIGURE 4 is a detail transverse section of FIGURE 1,
FIGURE 5 is a detail transverse section of an alternative to FIGURE 4,
FIGURE 6 is a diagrammatic axial section of an alternative to FIGURE 3,
FIGURE 7 is a detail longitudinal section of an alternative to FIGURE 1,
FIGURE 8 is a detail transverse section of another alternative to FIGURE 1, and
FIGURE 9 is a hydraulic circuit diagram.

The dynamometer illustrated in FIGURES 1, 2 and 4 employs a cam operated axial piston pump as the hydraulic machine. The dynamometer comprises three structures relatively rotatable on a principal axis 11 and the clearances are shown exaggerated to enable the structures more easily to be distinguished. The first is a stationary housing which in use is fixed to some external base, mounting or machine frame. This housing includes a drum 12, an end fitting 13, an end cover 14 and an end ring 15 having an integral thrust collar 16. These parts are bolted together, the bolts not being shown to avoid unnecessary and confusing detail.

The second structure is the outer casing of the hydraulic machine. This comprises a drum 17, an end fitting 18, an end spigot 19, a bearing ring 21, a bearing collar 22, a bearing seating 23 and a cam 24. This outer casing has its rotation relative to the stationary housing limited in this example by two diametrically opposite strain gauge links indicated at 25.

The third structure is the rotating part of the machine, to which the load is coupled. This comprises a shaft 26, journalled at one end in the seating 23 by a roller bearing 27 and at the other end directly in a bore in the end fitting 18. These bearings will result in direct transmission of slight torque between the third and second structures but as consideration will show, this has no effect on accuracy either when the dynamometer is used as an absorption dynamometer or when it is used as a motoring dynamometer. The shaft 26 has keyed to it a barrel 28 in which pump cylinder bores 29 parallel with the axis 11 are formed. Within these bores work pistons 31 having ball heads 32 carrying shoes 33 which cooperate with the cam 24 to reciprocate the pistons 31 in the cylinder bores 29 as the shaft 26 rotates in relation to the outer casing of the hydraulic machine.

The end fitting 18 and bearing ring 21 which are near the ends of the hydraulic machine have cylindrical surfaces accurately coaxial with the axis 11 and they have small clearance within corresponding coaxial cylindrical surfaces in the drum 12 and end fitting 13, and in them are formed recesses 34 constituting source regions for hydrostatic bearings which radially support the casing of the hydraulic machine. A face of the bearing ring 21 and a face of the bearing collar 22 are accurately normal to the axis 11, and they have small clearance from accurate faces normal to the axis 11 on opposite sides of the thrust collar 16. Recesses 35 are formed in the said faces of the thrust collar 16 to constitute source regions for hydrostatic bearings which locate the hydraulic machine axially within the stationary housing.

The recesses 34 and 35 are supplied through ducts 36, 37 respectively in the stationary housing, and they may be supplied from an external pressure source or from the high pressure side of the hydraulic machine. In either case each bearing is supplied through a suitable control element which may be a capillary restrictor or a valve.

An inlet connector not shown connects an inlet line not shown to the fitting 13 at 38 whence a duct 39 leads to an annular groove 41 in a cylindrical bore in the fitting 13 coaxial with the axis 11, into which extends with fine clearance a part of the end fitting 18. A duct 42 leads from a kidney shaped port 43 and opens radially in the periphery of the end fitting 18 in line with the groove 41. A duct 44 leads from each cylinder bore 29 and registers during the whole suction stroke with the kidney shaped port 43 in the fitting 18. By these means hydraulic fluid is led from the inlet line to the pump cylinder bores 29 without imposing any radial or circumferential loads on the outer casing of the hydraulic machine.

During the whole delivery stroke the duct 44 registers with another kidney shaped port 45 in the fitting 18, from which a duct 46 leads to a central space 47 in the fitting 18 and spigot 19, whence two diametrically opposite passages 48 lead to ports 49 opening in the periphery of the spigot 19 which is accurately cylindrical and extends with fine clearance in a corresponding bore in the end fitting 13. The bore of the latter has an annular grove 51, into which the ports 49 open, and thence a duct 52 leads to a socket 53 for a delivery fitting not shown by which a delivery line not shown is connected. By these means hydraulic fluid is led from the pump without imposing any radial or circumferential loads on the outer casing of the hydraulic machine.

Due to the clearance which is essential between the end fittings 13 and 18 in the region of the groove 41 and duct 42, and the clearance which is essential between the end fitting 13 and spigot 19 in the region of the groove 51 and ports 49, there is bound to be some leakage. This leakage depends on the clearance, its length, and its diameter, and also on the pressure. Accordingly the high pressure transfer has been provided at the periphery of the spigot 19 as this is the smaller diameter of the two regions in question in the illustrated example and for the same reason the spigot 19 has been made long. It will be understood that the above references to inlet and outlet refer to one direction of rotation of the machine. If the machine is to be run in the opposite direction the inlet will now be the outlet, and the outlet the inlet so that the pressure will be high on what is the inlet side in the above description. Again if the dynamometer is used as a motoring dynamometer for the same direction of rotation as the above implied, the pressure will be high on what is the inlet side in the above description. In such cases the leakage will be correspondingly increased. If a dynamometer in accordance with the invention is to be used for both directions of rotation or for both purposes it would be desirable to dispose these transfer arrangements to reduce the diameter of the cylindrical surface into which the duct 42 opens. This can be done by increasing the axial length of these parts of the dynamometer.

The use of two diametrically opposite links 25 by balancing out the radial load which would be imposed at one end if only one were used avoids the tilting effect which would tend to set the spigot 19 eccentrically in the bore in the fitting 13 and similarly for the fitting 18 in the fitting 13; such eccentricity tends to increase the leakage. Two strain gauge links also have the advantage that they can be included in opposite arms of the bridge circuit used for evaluating the torque and give a symmetrical arrangement. However, it is quite practical to use only a single link if this is desired.

Since direct access to the strain gauge links 25 is not necessary, they may be protected by a cover 54 attached to the stationary housing. Leads not shown pass through the cover to the links to connect them into the necessary measuring circuit.

A space 55 is provided between the drums 12 and 17 with which other spaces, in particular the space between the cam 24 and the barrel 28, communicate and into which the liquid leaking from the hydraulic circuit drains, and which communicates by a fitting not shown in the stationary housing with a drainage line.

In the illustrated example the axial bearings, of which the recesses 35 are the source regions, are both at one end, but they may be disposed at opposite ends, as indicated in FIGURE 3. Since the rotational freedom of the outer casing of the machine in the stationary housing only has to provide for such angular movement as the loading system may require which is very small, it is also equally feasible to provide the recesses 34 and 35 not in the stationary housing as in FIGURES 1, 3 and 4 but in the outer casing of the machine, because the ducts in the stationary housing will never move out of line with the recesses, as shown for one of the ducts 36 and recesses 34 in FIGURE 5 for the radial bearings but which equally applies to the ducts 37 and recesses 35.

Again instead of having separate hydrostatic bearings for radial and axial location, combined bearings can be used as in FIGURE 6, provided with source recesses at 56 in oppositely directed conical surfaces 57 in the stationary housing having fine clearance from corresponding surfaces 58 on the outer casing of the machine. Instead of the recesses 56 being in the surfaces 57 they could be in the surfaces 58, as explained above for the case of separate radial and axial bearings.

It is essential that the source regions of hydrostatic bearings which carry radial loads should be symmetrically distributed round the axis, three equally spaced being the minimum, but in the case of separate axial bearings as in FIGURES 1 and 3, the number of their source regions and their distribution is less important though they are desirably symmetrically distributed.

An essential feature of the fluid transfer arrangements is that they should not impose any tangential loads. In the illustrated example, in the one case there is a complete annular groove 41 and in the other a complete annular groove 51. Provided these grooves are of sufficient cross section and the ducts opening into them are radially directed the precise number and disposition of the latter is unimportant because the groove sufficiently equalises the pressure all round and tangential forces do not arise.

Variations are possible. Thus instead of the grooves 41 and 51 being in the outer member either or both could be in the inner member, as indicated in FIGURE 7 for the groove 41 which is shown in the member 18, while the duct 39 continues right through the member 13. Since as above mentioned there is only minute rotational movement of the outer casing of the machine in relation to the stationary housing, it is also possible to use a plurality of radial ducts in the one part registering with similar ducts in the other part. As shown for example in FIGURE 8 for the inlet arrangements instead of a single duct 39 as in FIGURE 1, three such ducts 39a terminate in ports 39b which register with corresponding ports 42a at the ends of ducts 42b communicating with the kidney shaped inlet port 43. Obviously this scheme may be applied to any number of ports and is also applicable to the outlet arrangements. Provided the ducts are symmetrically distributed, there will be no resultant radial loads imposed by the transfer arrangements though the hydrostatic bearings which support the machine casing would be able to take substantial radial loads additional to those imposed by the weight if the dynamometer is used with the axis horizontal.

Another possible variation is to form the grooves or ports in transverse faces of the machine casing and the stationary housing, or faces of some other form e.g. conical. In these cases there may be a resultant axial load, but the hydrostatic bearings can take those without difficulty. They can also deal with the weight of the machine if the dynamometer is used with the axis vertical.

Since the hydrostatic bearings locate the machine in all directions, the dynamometer can be used not only with its axis horizontal or vertical but at any inclination. A factor which may need to be taken into consideration in connection with the attitude of the dynamometer is the disposition of the drainage connections. To measure the speed of the rotating parts a magnetic pick-up head 59 may be mounted in the drum 17 and co-operate with notches and magnetic inserts indicated at 61 in the rotating structure conveniently the barrel 28.

A hydraulic circuit end auxiliary equipment which enable the dynamometer to be used for power absorption or motoring and in either direction of rotation, are shown in FIGURE 9 in which the dynamometer is indicated generally at A.

The lines 38a and 53a connected to the sockets 38 and 53 lead to two directional valves B and C which are of the closed centre type and control the connection of the dynamometer respectively into a circuit for absorption and a circuit for motoring.

For power absorption the valve C is left in centre position as indicated and the valve B moved in one or other direction according to the direction of rotation required for power absorption. Fluid from one socket of the dynamometer A flows via the directional valve B to a restrictor D and thence via a heat exchanger E and valve B to the other socket of dynamometer A. The restrictor D may be a valve of any convenient type such as a variable relief valve or a variable orifice. Also it may if desired be controlled from the speed pick-up 59 via a control circuit 62 to keep the speed constant. Leakage losses in this closed circuit are made up by a line 63 from a power pack F comprising a tank into which a drainage line 64 from the drainage space in the dynamometer leads, and a pump, which also serves to maintain the inlet port of dynamometer A at a small positive pressure to avoid cavitation. The make-up line 63 joins the main circuit downstream of the restrictor D and upstream of the heat exchanger E so that all the fluid reaching the inlet port of dynamometer A does so via heat exchanger E and the fluid temperature can thus be accurately controlled under all operating conditions.

The power pack F also supplies the hydrostatic bearings of the dynamometer A through a line 65.

At low speeds the leakage relative to the fluid being pumped increases and thus limits the rotational speed down to which the dynamometer can provide a high torque reaction. If it is required that the dynamometer should provide a high torque reaction at very low rotational speeds, a small motor driven high pressure pump G may be used to provide the necessary make up at a point between the valves B and D. At high speeds, pump G is not used and reverse flow along the line 66 from it is prevented by a check valve H.

For operation as a motoring dynamometer directional valve C is moved from its central position as shown and directional valve B is held in its central position. Fluid now flows from a motor driven pump J via directional valve C to the dynamometer A and thence returns via directional valve C to the inlet port of pump J. Pump J is preferably of variable displacement type so that the rotational speed of dynamometer A can be varied.

What is claimed is:

1. In a hydraulic dynamometer comprising a stationary housing, a hydraulic machine having an outer casing supported within said stationary housing, anti-friction bearings carrying said outer casing rotatably through at least a small angle in relation to said stationary housing, a torque-measuring linkage between said casing and stationary housing restraining rotation of said casing in relation to said housing, and connections between the hydraulic machine and external lines one serving as an inlet line and the other as an outlet line through ports or passages formed in said casing and housing such that said casing is freed from any substantial static rotational constraint except that imposed by the torque-measuring linkage, the improvement which consists in said hydraulic machine being a positive displacement machine capable of acting as a pump and as a motor from a low speed upwards.

2. A hydraulic dynamometer according to claim 1 in which the anti-friction bearings are hydrostatic bearings which comprise at least three angularly distributed radial bearings near the ends of the hydraulic machine, and axial bearings coacting with oppositely facing transverse surfaces thereof.

3. A hydraulic dynamometer according to claim 1 in which the anti-friction bearings comprise at least three hydrostatic bearings angularly distributed over each of two oppositely directed axially spaced conical surfaces.

4. A hydraulic dynamometer according to claim 1 in which the connections between the hydraulic machine and the external lines are constituted by registering annular grooves formed in the surfaces of the casing and of the housing respectively.

5. A hydraulic dynamometer according to claim 1 in which the connections between the hydraulic machine and the external lines are constituted by an annular groove and at least one port registering therewith, the groove and port being formed one in the surface of the casing and the other in the surface of the housing respectively.

6. A hydraulic dynamometer according to claim 1 in which the connections between the hydraulic machine and the external lines are constituted by symmetrically distributed ports in the surfaces of the casing and the housing respectively, located so that the ports in one surface register with those in the other.

7. A hydraulic dynamometer according to claim 1 in which the torque-measuring linkage includes two diametrically opposite strain gauge links.

8. A hydraulic dynamometer according to claim 1 in which the hydraulic machine is a piston pump.

9. A hydraulic dynamometer according to claim 8 in which the machine is a cam-operated axial piston pump.

10. A hydraulic dynamometer according to claim 1 provided with an external circuit which includes a variable restrictor in the outlet line, a heat exchanger through which the liquid delivered is returned to the inlet line, and means to return liquid leaking away in the dynamometer to a point between the restrictor and the heat exchanger.

11. A hydraulic dynamometer provided with an external circuit as claimed in claim 10 in which the external circuit also includes a pump for supplying hydraulic fluid under pressure to the upstream side of the restrictor and a check valve through which said pump delivers.

12. A hydraulic dynamometer according to claim 1 provided with an external circuit which includes a power driven pump whereby the hydraulic machine of the dynamometer can be driven to motor a load coupled thereto, and means to return liquid leaking away in the dynamometer to the inlet to the power driven pump.

13. A hydraulic dynamometer according to claim 1 provided with an external circuit which includes a variable restrictor, a heat exchanger, a motor driven pump receiving liquid leaking away in the dynamometer and delivering into a line connecting the outlet side of the restrictor to the heat exchanger, a first directional valve having a closed centre position, said valve in its opposite end positions connecting said restrictor and heat exchanger in opposite flow directions to the external lines connected to the hydraulic machine by said connections, a motor driven pump, and a second directional valve having a closed centre position, said second valve in its opposite end positions connecting said motor driven pump in opposite flow directions to the external lines connected to the hydraulic machine by said connections.

References Cited by the Examiner

UNITED STATES PATENTS

| | | | |
|---|---|---|---|
| 1,944,334 | 1/1934 | Tracy | 73—134 |
| 2,996,913 | 8/1961 | Diesfeld et al. | 73—134 |
| 3,050,993 | 8/1962 | Draughon et al. | 73—134 X |
| 3,115,034 | 12/1963 | De Hart | 73—134 |

RICHARD C. QUEISSER, *Primary Examiner.*

C. A. RUEHL, *Assistant Examiner.*